United States Patent
Komano

(10) Patent No.: US 9,102,164 B2
(45) Date of Patent: *Aug. 11, 2015

(54) DATA PROCESSING APPARATUS, DATA PROCESSING METHOD, AND STORAGE MEDIUM FOR EFFECTING RECORDING ON A RECORDING MEDIUM BY APPLYING A PLURALITY OF RECORDING AGENTS WITH RELATIVE SCANNING BETWEEN A RECORDING UNIT FOR APPLYING THE RECORDING AGENTS AND THE RECORDING MEDIUM

(71) Applicant: CANON KABUSHIKI KAISHA, Tokyo (JP)

(72) Inventor: Yusuke Komano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/019,372

(22) Filed: Sep. 5, 2013

(65) Prior Publication Data

US 2014/0002526 A1    Jan. 2, 2014

Related U.S. Application Data

(63) Continuation of application No. 13/181,360, filed on Jul. 12, 2011, now Pat. No. 8,537,406.

(30) Foreign Application Priority Data

Jul. 15, 2010    (JP) .................................. 2010-160986

(51) Int. Cl.
G06F 3/12    (2006.01)
B41J 2/21    (2006.01)
G06K 15/10   (2006.01)
G06K 15/02   (2006.01)
H04N 1/00    (2006.01)
G06F 15/00   (2006.01)

(52) U.S. Cl.
CPC ................. *B41J 2/21* (2013.01); *G06K 15/107* (2013.01); *G06K 15/1871* (2013.01); *H04N 1/00* (2013.01); *G06K 2215/111* (2013.01)

(58) Field of Classification Search
CPC ............ G06K 15/107; G06K 15/1871; G06K 2215/111; B41J 2/21; H04N 1/00
USPC ............ 358/1.2, 1.4, 1.8, 1.9, 3.03, 3.1, 3.12, 358/3.23, 3.26; 399/79, 82; 347/43, 86, 347/115; 382/162, 164, 165, 167, 168
See application file for complete search history.

(56) References Cited

U.S. PATENT DOCUMENTS

| | | | | |
|---|---|---|---|---|
| 6,652,066 | B2* | 11/2003 | Teshigawara et al. | 347/41 |
| 6,729,710 | B2* | 5/2004 | Chikuma et al. | 347/14 |
| 6,738,168 | B1* | 5/2004 | Usui et al. | 358/520 |
| 7,398,029 | B2* | 7/2008 | Jacobsen et al. | 399/79 |
| 7,463,384 | B2* | 12/2008 | Tsuchiya et al. | 358/1.9 |
| 8,537,406 | B2* | 9/2013 | Komano | 358/1.16 |
| 2011/0032551 | A1* | 2/2011 | Faber et al. | 358/1.9 |

FOREIGN PATENT DOCUMENTS

JP    2004-130545 A    4/2004

* cited by examiner

*Primary Examiner* — Gabriel Garcia
(74) *Attorney, Agent, or Firm* — Canon U.S.A., IP Division

(57) ABSTRACT

A data processing apparatus determines a color range based on a dot counting value of a number of colors smaller than a number of colors subjected to thinning processing. Thus, even if the number of ink colors subjected to the thinning processing is great, a processing load of the determination of the color range can be reduced.

19 Claims, 19 Drawing Sheets

CYAN UPPER
COUNTED NUMBER OF DOTS

CYAN LOWER
COUNTED NUMBER OF DOTS

MAGENTA UPPER
COUNTED NUMBER OF DOTS

MAGENTA LOWER
COUNTED NUMBER OF DOTS

YELLOW UPPER
COUNTED NUMBER OF DOTS

YELLOW LOWER
COUNTED NUMBER OF DOTS

BLACK UPPER
COUNTED NUMBER OF DOTS

BLACK LOWER
COUNTED NUMBER OF DOTS

DATA PROCESSING APPARATUS, DATA PROCESSING METHOD, AND STORAGE MEDIUM FOR EFFECTING RECORDING ON A RECORDING MEDIUM BY APPLYING A PLURALITY OF RECORDING AGENTS WITH RELATIVE SCANNING BETWEEN A RECORDING UNIT FOR APPLYING THE RECORDING AGENTS AND THE RECORDING MEDIUM

CROSS-REFERENCE TO RELATED APPLICATIONS

This application is a continuation of U.S. patent application Ser. No. 13/181,360 filed Jul. 12, 2011 (now U.S. Pat. No. 8,537,406), which claims priority to Japanese Patent Application No. 2010-160986 filed Jul. 15, 2010. Each of U.S. patent application Ser. No. 13/181,360 and Japanese Patent Application No. 2010-160986 is hereby incorporated by reference herein in its entirety.

BACKGROUND OF THE INVENTION

1. Field of the Invention

The present invention relates to a data processing apparatus, a data processing method, and a storage medium for recording a color image with high quality to a recording medium.

2. Description of the Related Art

Japanese Patent Application Laid-Open No. 2002-96460 discusses a method that prevents generation of streaks in a boundary portion between recording regions corresponding to bands when a recording unit records an image corresponding to one band by scanning the image in the scanning direction. That is, a color range in a region of interest is determined depending on an amount of liquid (e.g., an amount of ink) used for recording to a divided region near a boundary portion between the bands. Further, recording data is thinned depending on the color range to reduce the used amount of liquid.

According to the method, the color range is determined with cyan, magenta, and yellow. The determination result is used for thinning processing of cyan, magenta, and yellow. The number of colors used for determining the color range is equal to the number of colors used for the thinning processing. However, when growing the number of ink colors provided for a recording apparatus, i.e., the number of ink colors for the thinning processing, the number of colors used for the determination of the color range also rises up. Therefore, there is a problem of an increase in processing load of the determination of the color range.

SUMMARY OF THE INVENTION

The present invention is directed to a data processing apparatus and a data processing method capable of suppressing an increase in processing load in determination of a color range.

According to an aspect of the present invention, a data processing apparatus processes data used for recording on a recording medium by scanning of a recording unit for applying a plurality of first-type recording agents and a second-type recording agent to the recording medium. The data processing apparatus includes: an acquisition unit configured to acquire data on amounts of the first-type recording agents and the second-type recording agent for each of a plurality of unit regions obtained by dividing a neighboring area at a boundary between bands recorded on the recording medium by relative scanning of the recording unit; a determination unit configured to determine a relation of the amounts of the first-type recording agents based on the data on the amounts of the first-type recording agents acquired by the acquisition unit; a decision unit configured to decide a reduction rate for reducing the amounts of the first-type recording agents applied to a predetermined region in the unit region based on the relation determined by the determination unit and data on a total amount of the first-type recording agents, and further decide a reduction rate for reducing the amount of the second-type recording agent applied to the predetermined region based on the relation and the data on the amount of the second-type recording agent acquired by the acquisition unit; and a reduction unit configured to reduce the amounts of the first-type recording agents and the second-type recording agent applied to the predetermined region based on the reduction rates of the first-type recording agents and the second-type recording agent decided by the decision unit.

According to another aspect of the present invention, a data processing method processes data used for recording on a recording medium by scanning of a recording unit for applying a plurality of first-type recording agents and a second-type recording agent to the recording medium. The data processing method includes: acquiring data on amounts of the first-type recording agents and the second-type recording agent for a plurality of unit regions obtained by dividing a neighboring area at a boundary between bands recorded on the recording medium with relative scanning of the recording unit; determining a relation of the amounts of the first-type recording agents based on the acquired data on the amounts of the first-type recording agents; deciding a reduction rate for reducing the amounts of the first-type recording agents applied to a predetermined region in the unit region based on the determined relation and data on a total amount of the first-type recording agents, and further deciding a reduction rate for reducing the amount of the second-type recording agent applied to the predetermined region based on the relation and data on the amount of the second-type recording agent; and reducing the amounts of the first-type recording agents and the second-type recording agent applied to the predetermined region based on the decided reduction rates of the first-type recording agents and the second-type recording agent.

According to exemplary embodiments of the present invention, an increase in processing load can be suppressed in the determination of the color range.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

A description is given of an example of a serial printer (recording apparatus) that records data by using recording liquid (inks) of four colors of cyan, magenta, yellow, and black according to an exemplary embodiment of the present invention.

Figure 1A:
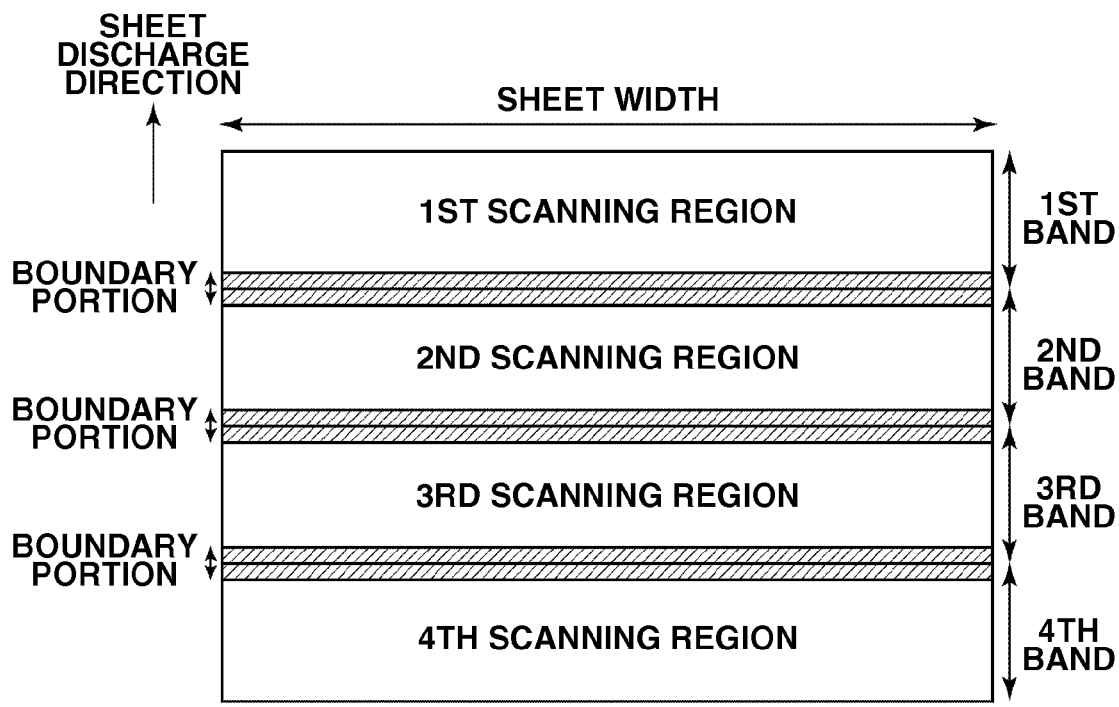
FIGS. 1A and 1B illustrate a recording region on a recording medium and a recording head according to an exemplary embodiment of the present invention.
Figure 1B:
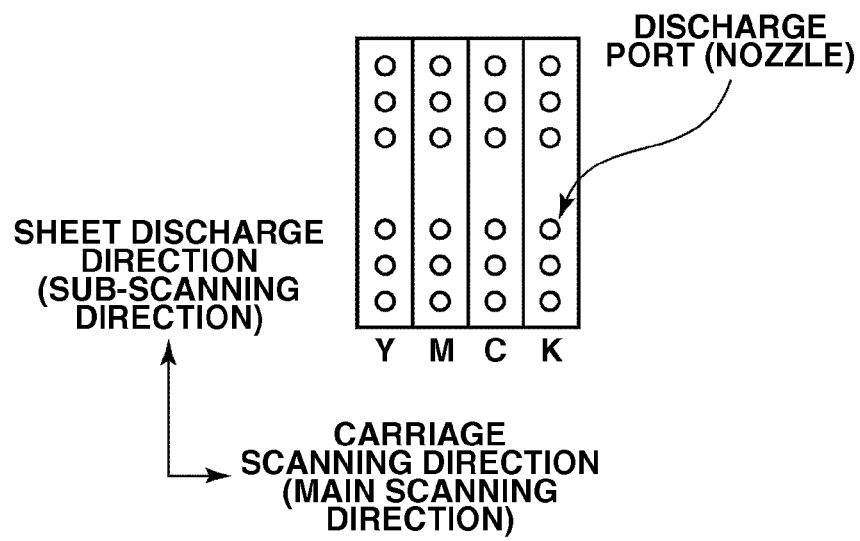

FIG. 1A illustrates a result of recording to a recording medium by scanning of a recording head. Corresponding to a width of a nozzle provided for the recording head, a recording region (band) is formed. The recording head discharges inks with a plurality of different colors (cyan, magenta, and yellow). As illustrated in FIG. 1B, the recording head includes a plurality of nozzle arrays corresponding to the colors. For example, one nozzle array includes 256 nozzles. In the scanning of the recording head, the boundary positions of the colors are similar to each other. Therefore, the density increases at a boundary portion (including the boundary between the bands, hatched predetermined region) between a first scanning region and a second scanning region or a boundary portion between the second scanning region and a third scanning region, so that streaks such as boundary streak or banding are generated.

In data corresponding to one band, an amount of data (an amount of ink) used for recording to the boundary portion between the bands is acquired, and a color range is determined from the amount of data. With the color range, the amount of data, and thinning control information (data reduction information), thinning processing (data reduction processing) is executed. Thus, data in the boundary portion is recorded with a proper amount of ink, thereby suppressing the generation of streaks.

In the data corresponding to one band, the boundary portion between the bands is divided in the scanning direction into a plurality of blocks (unit regions or blocks). The size of the unit region (block) in the scanning direction is determined as a predetermined number of columns (e.g., 16 columns), and a number of dots is counted in the unit region. The counting operation is independent for the colors. The color range of the region (unit region) is determined based on a result of the dot counting.

According to the present exemplary embodiment, in four colors of cyan, magenta, yellow, and black, the color range of the boundary portion between the bands is determined based on dot counting values of cyan, magenta, and yellow. With the configuration, the color range is determined based on dot counting values of a number of colors smaller than that for the thinning processing. Therefore, when the number of ink colors for the thinning processing is large, a processing load of the determination of the color range is reduced. The configuration is possible because it is common that black is dominantly used in a region with high density independently of the color range (hue), and a used amount of black (number of dots) does not greatly influence the color range (hue). Further, in a recording apparatus using light cyan and light magenta, used amounts (numbers) of cyan and magenta are dominant as the color range (hue), as compared with amounts (numbers) of light cyan and light magenta. Therefore, light cyan and light magenta are not used for the determination of the color range.

Figure 2:
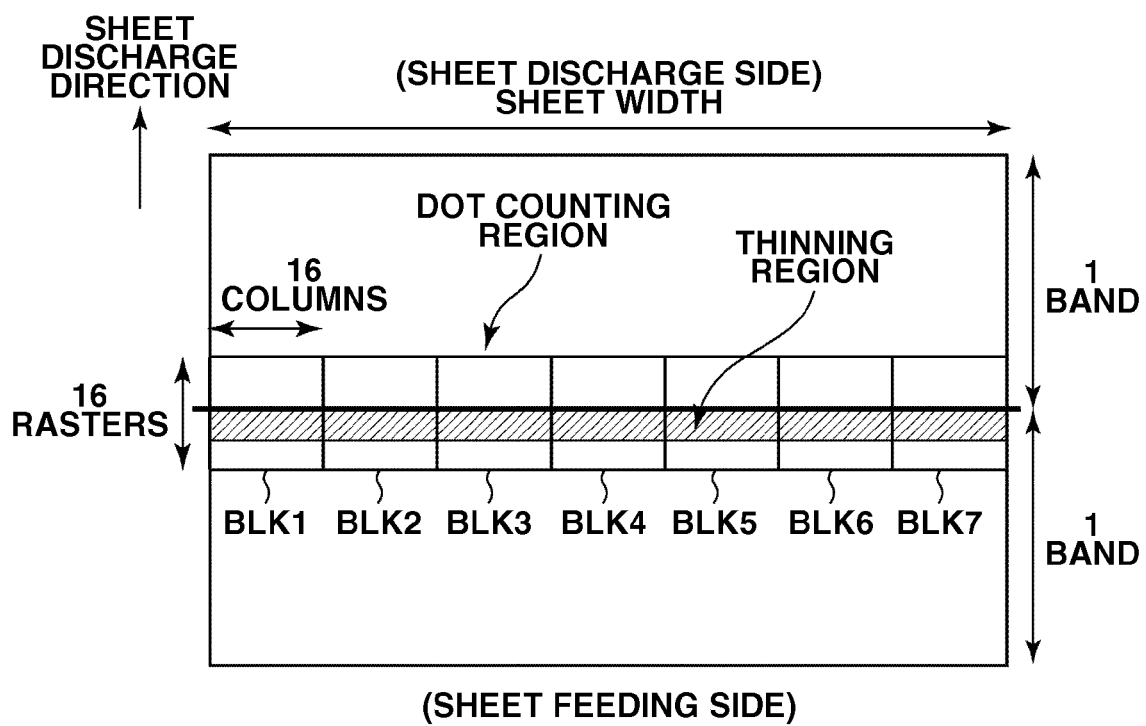
FIG. 2 illustrates a boundary portion between the recording regions, a dot counting region, and a thinning region according to the exemplary embodiment.

As illustrated in FIG. 2, regions (BLK1 to BLK7) each having 16 columns (dots)×16 rasters (dots) across the boundary between the bands are assigned. The region is referred to as a unit region. The unit region corresponds to a thinning region of data, which will be described below. A hatched portion in FIG. 2 illustrates the thinning region, and the number of rasters included in the unit region is larger than that of the thinning region. With the region designation, by counting the number of dots of print data between the bands across the boundary portion, print duty (dot density) or an amount of data is acquired in the boundary portion.

The thinning region is a region for the thinning processing. The thinning region in FIG. 2 corresponds to four rasters in the sheet feeding side (on the upstream side in the conveyance direction of the recording medium) of the boundary portion between the bands. According to the present exemplary embodiment, the sheet feeding side is set. Alternatively, a region on the sheet discharge side (on the upstream side in the conveyance direction of the recording medium) may be set as the thinning region, or both the regions on the sheet feeding side and the sheet discharge side may be set.

In the thinning processing on the sheet feeding side, the lower end of the band to be prior recorded is thinned. Even if recording liquid of the band to be subsequently recorded flows to the previous band, the density is proper, and the generation of boundary streak is suppressed. In the thinning processing of several rasters, a thinning degree (herein, referred to as a rank graph) is independently set for every raster or based on the unit of several rasters. For example, the thinning level is set to be increased as a portion is nearer the band boundary portion, thereby improving the thinning accuracy, i.e., the accuracy of the thinning processing. The thinning operation is effectively executed by division for each raster because of a factor that the generation of boundary streak does not simply appear only in the boundary between the bands but ink bleeding is consecutively spread from a portion away by several rasters according to a boundary state of dots. That is, only the band boundary is not processed, but one or two rasters in the boundary portion therenear induce the generation of streak. Depending on the distance from the band boundary portion, e.g., a region away by one raster, a region away by two rasters, or a region away by three rasters, a thinning rate can be changed for every raster because the influence on the boundary streak is varied.

According to the present exemplary embodiment, a hue and saturation of a region (unit region) of interest are determined from the dot counting value of the color. The hue and the saturation are singly expressed as a color range. The color range of the region of interest is determined from the number of pieces of recording data in the boundary portion (a number of dots recorded by the recording head). The thinning rank (thinning level) is set for each used ink and each recording position according to the color range. The thinning processing is performed for each color by using the set thinning rank, thereby suppressing the boundary streak generated between the bands in one-pass print (for printing an image corresponding to one band by one-time scanning).

Figure 3:
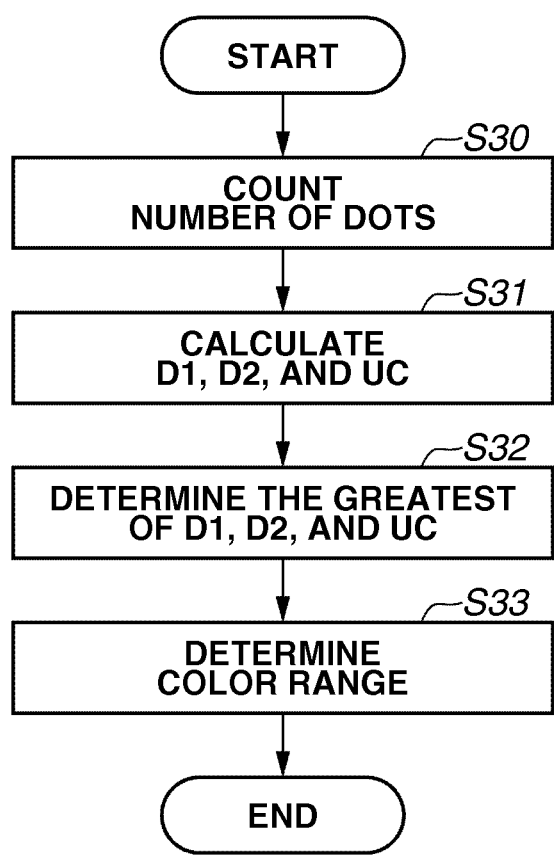
FIG. 3 illustrates a processing flowchart of determination of a color range according to the exemplary embodiment.
Figure 4A:
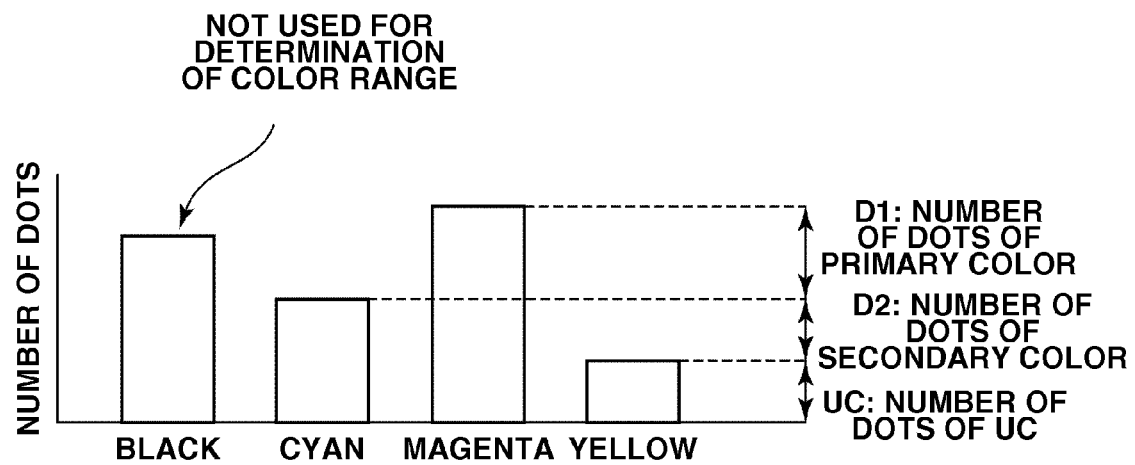
FIGS. 4A and 4B illustrate an example of a dot counting result and color range division according to the exemplary embodiments.
Figure 4B:
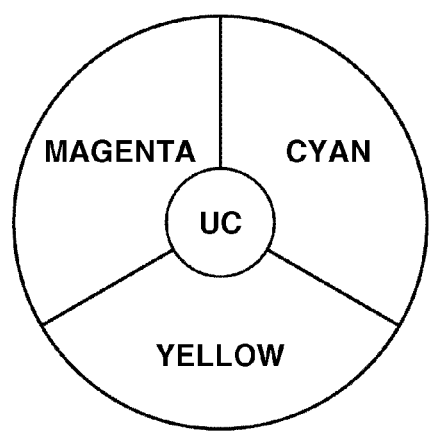

FIG. 3 illustrates a flowchart of determination of a color range (selection of a color range). FIG. 4A illustrates an example of a dot counting value of a unit region. FIG. 4B illustrates division of the color range. In an example in FIG. 4A, magenta, cyan, and yellow are illustrated in order of a greater number of dots. A portion UC generally has the smallest number of dots of yellow in cyan, magenta, and yellow, and a secondary color (referred to as D2, blue according to the present exemplary embodiment) is a portion obtained by subtracting UC from cyan with the second greatest number of dots. A primary color (referred to as D1, magenta according to the present exemplary embodiment) is a portion obtained by subtracting cyan with the second greatest number of dots from magenta with the first greatest number of dots.

In step S31, D1, D2, and UC are calculated. In step S32, the greatest value of D1, D2, and UC is determined. In step S33, the color range is determined. According to the present exemplary embodiment, D1 is the greatest in the three values, and the determination of the color range is thus magenta as D1.

When an equal condition is established between D1, D2, and UC and a number of the greatest value is two or three, as the color range, UC, D2, and D1 (UC is used if UC is equal to D2, and D2 is used if D1 is equal to D2, and D1 is not actually used) are used in this order. According to the present exemplary embodiment, the classification of color range with the primary color and UC is performed. The classification of color range including the secondary color may be performed, thereby finely setting the determination of the color range. FIG. 4A illustrates a number of dots of black. However, black is not used in the determination of the color range. Therefore, black is not used in the flow of the determination of the color range.

Figure 5:
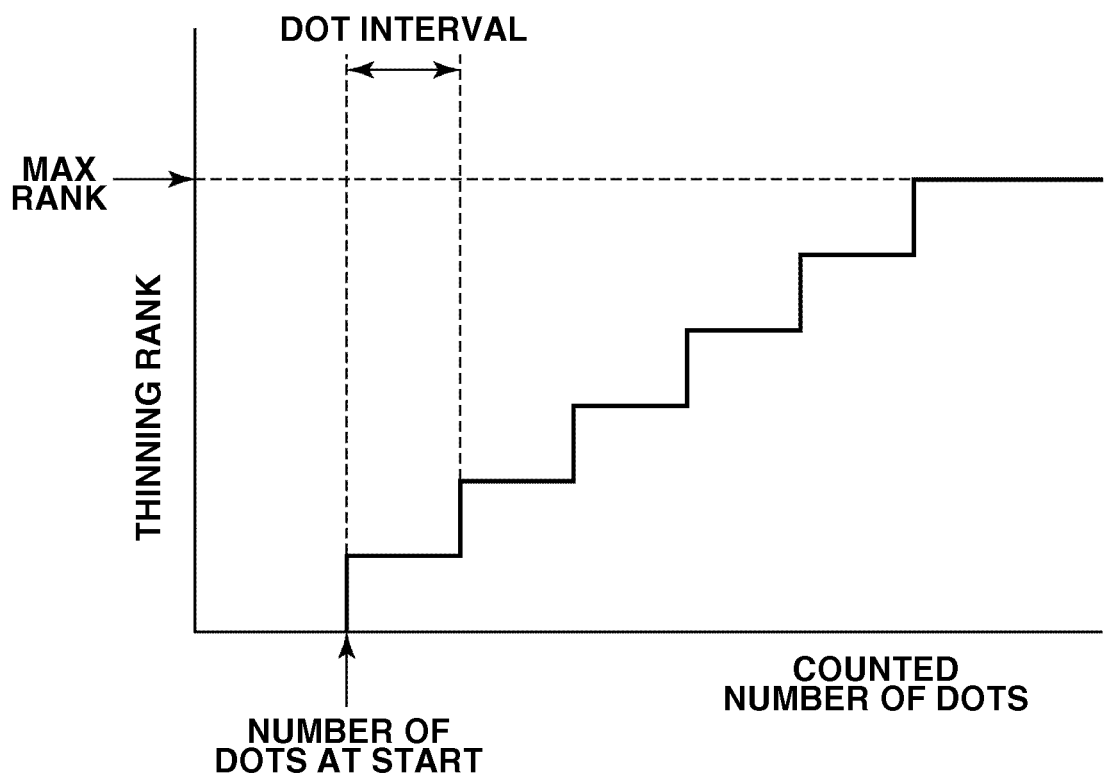
FIG. 5 illustrates a thinning rank according to the exemplary embodiment.

FIG. 5 illustrates an example of a graph of the thinning rank for determining a thinning rate according to the present exemplary embodiment. The graph of the thinning rank illustrates the thinning rank corresponding to the counting number of dots in the dot counting region for every ink as a thinning target. The number of divisions of the thinning rank is designated in advance. According to the present exemplary embodiment, the thinning rate is divided and determined into nine of 0%, 12.5%, 25%, 37.5%, 50%, 62.5%, 75%, 87.5%, and 100% to provide a rank graph.

The graph of the thinning rank is designated by combining three values of the number of start dots, a dot interval, and a maximum (MAX) rank. The parameters are described. First of all, the number of start dots means the dot counting value when the thinning rate 12.5% (the thinning rank 1) starts to be used. The dot interval means a range of the counting number of dots by the transition of the next thinning rate (25% next to 12.5%), i.e., a range of the counting number of dots using the same thinning rate. The MAX rank is a maximum thinning rate. The thinning rate reaches the MAX rank without selecting the thinning rate more than the MAX rank. Then, even if the counting number of dots corresponds to the dot interval, the thinning rate is not increased and the thinning rate of the MAX rank is kept.

According to the present exemplary embodiment, the graph of thinning rank is determined with the three parameters (number of start dots, thinning interval, and MAX rank). However, the determination of the graph of thinning rank is not limited to the method. In the thinning rank according to the present exemplary embodiment, a relation between the counting number of dots and the thinning rate is only linear. Therefore, the graph of thinning rank may be prescribed. The thinning rate may not be limited to the nine steps according to the present exemplary embodiment, and the number of steps of the thinning rate may be increased or decreased according to necessity.

Figure 6:
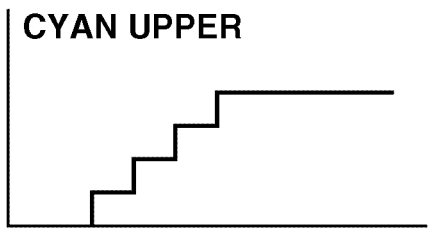
FIG. 6 illustrates the thinning rank of the color range according to the exemplary embodiment.
Figure 6:
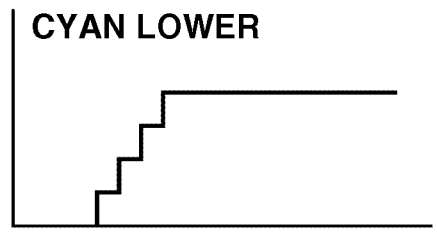
Figure 6:
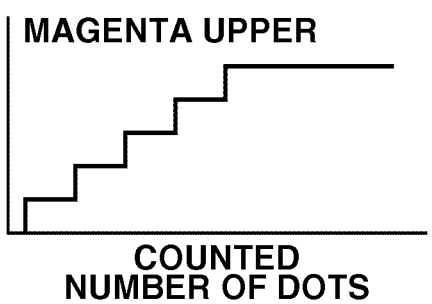
Figure 6:
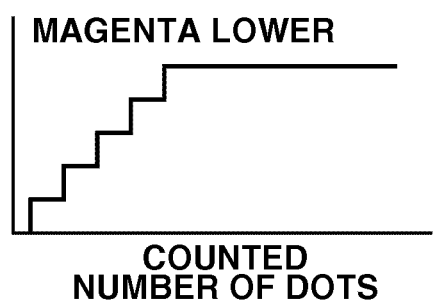
Figure 6:
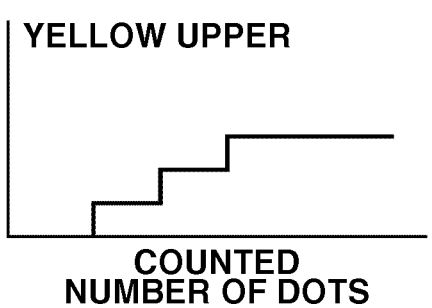
Figure 6:
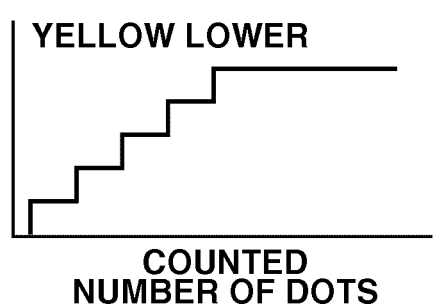
Figure 6:
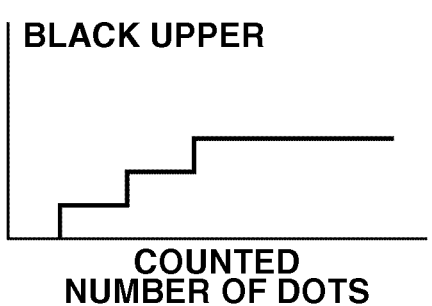
Figure 6:
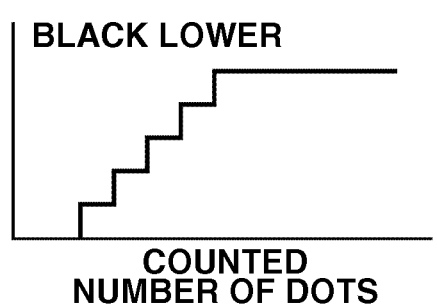

FIG. 6 illustrates an example of the graph of thinning rank according to the present exemplary embodiment. A proper graph of thinning rank is set to the color range. The example illustrates the color range of magenta.

The thinning rank is designated for each color (cyan, magenta, yellow, and black). An independent graph of the thinning rank is prepared for each region obtained by dividing four rasters in the thinning region into two parts having two rasters in the conveyance direction (sub-scanning direction). Therefore, as illustrated din FIG. 6, eight graphs (for cyan upper, cyan lower, magenta upper, magenta lower, yellow upper, yellow lower, black upper, and black lower) of the thinning rank are determined. According to the present exemplary embodiment, with respect to cyan, magenta, and yellow, the thinning rank is determined based on the sum of the counting numbers of dots of cyan, magenta, and yellow. Further, with respect to black, the thinning rank is determined based on the counting number of dots for only black.

FIG. 6 illustrates only the graph to the color range (magenta according to the present exemplary embodiment) as a result of the determination of the color range. Actually, the combination is further provided for cyan, yellow, and UC. According to the present exemplary embodiment, the total number of the graphs of thinning rank is 24=4 (number of colors as a thinning target)×3 (number of divisions of the color range)×2 (number of raster divisions).

By setting the graph of thinning rank for each color (for each different ink), it is possible to solve the boundary streak due to the difference of the used ink, caused by the difference in operation on the recording medium by the ink or the difference of viewing the streak depending on the difference in brightness or saturation between the inks.

The graph of thinning rank is set for each color, thereby dealing with the change in colors at the end caused by the discharge order (adhesion order) to the recording medium in the boundary portion between the bands. Although the operation is varied depending on the time lag of adhesion of the ink to the recording medium or characteristics of the recording medium, the change in colors at the end means that the magenta edge is created, which will be ejected, in recording order of cyan and magenta at the same position on a plain sheet, with a short time lag in the horizontally-arranged recording heads according to the present exemplary embodiment. When the color changes at the end, the thinning is changed for each recording ink, that is, in the ejection order of cyan and magenta, the thinning rate of magenta is higher than that of cyan. Thus, the level of the boundary streak is set to be improved.

According to the present exemplary embodiment, four rasters are provided as the thinning processing regions, and are further divided into two parts. Alternatively, the four rasters may be divided into four parts to designate the graph of thinning rank.

According to the present exemplary embodiment, with a thinning system referred to as sequential multi-scan (SMS) thinning processing, thinning processing of print data is executed. In the SMS thinning processing, data as a thinning pattern is provided, and a specific bit as the thinning pattern (e.g., most significant bit (MSB)) is read according to the counting value each time when there is print data ("1"). When the print data is 1, the print data is not thinned (set to "1" and the discharge is executed). On the other hand, when the counting value is 0, the print data is thinned ("1" is changed to "0" and the discharge is not executed). The counting value is increased each time when there is the print data. The next counting value is 1 after a data length (16 bits according to the present exemplary embodiment) of the thinning pattern reaches maximum. That is, according to the processing method, the thinning dot is determined (thinning processing is performed) by repeating the processing for each print data. According to the present exemplary embodiment, the thinning pattern is prepared corresponding to the thinning rates (9 steps of 0%, 12.5%, 25%, 37.5%, 50%, 62.5%, 75%, 87.5%, and 100%) for each thinning rank, thereby performing the SMS thinning processing for every thinning rank. In the SMS thinning processing, it is determined whether only the dot having the print data is thinned. Thus, the operation may be not synchronized with the pattern of the print data. The thinning processing method can also include a method using a pattern mask and an error diffusion (ED) method.

Figure 7:
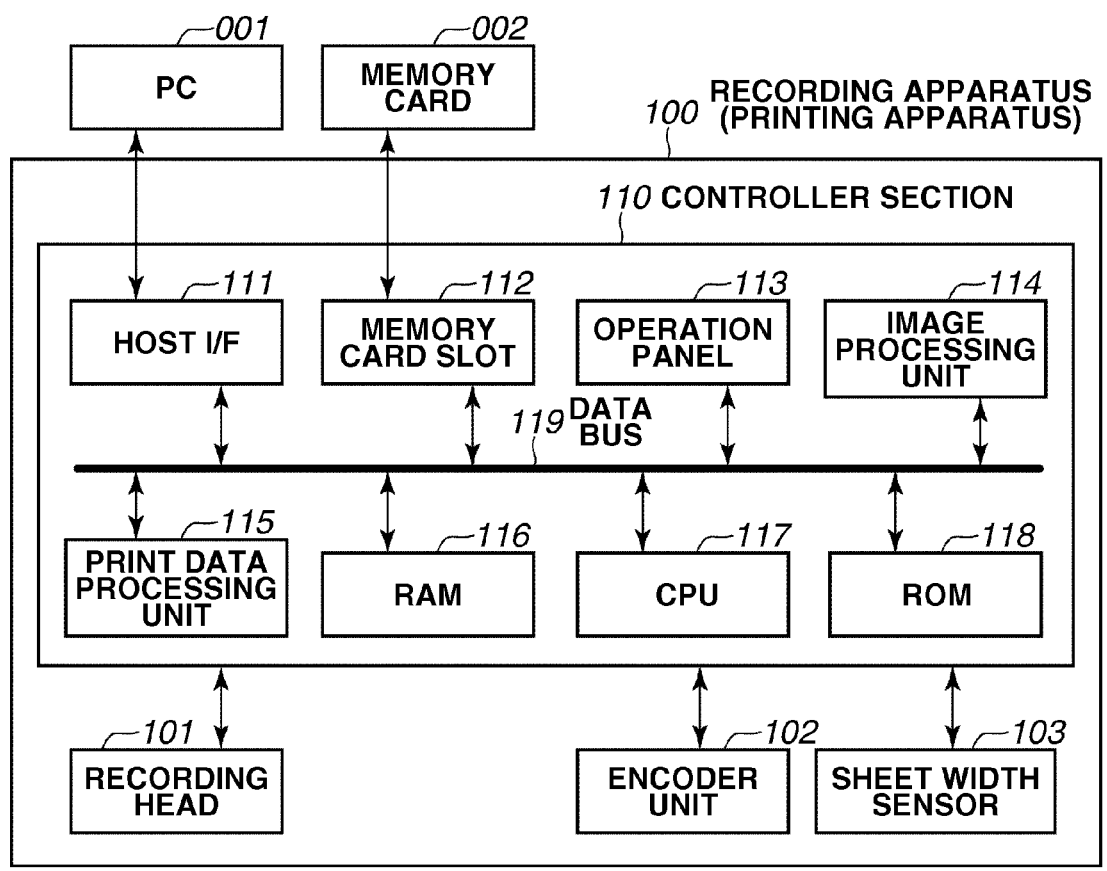
FIG. 7 illustrates a control circuit in the recording apparatus according to the exemplary embodiment.

FIG. 7 illustrates a block diagram of a circuit configuration of a recording apparatus (printing apparatus) according to the present exemplary embodiment. A recording apparatus (printing apparatus) 100 includes a controller unit 110 and a recording head 101. The controller unit 110 externally receives image data or a control command, and generates a control signal. The controller unit 110 transfers the control signal to the recording head 101. Further, the recording head 101 discharges the recording liquid according to the control signal to form an image on a sheet surface.

The controller unit 110 is described in detail. The controller unit 110 includes a host interface 111, a central processing unit (CPU) 117, a random access memory (RAM) 116, a read-only memory (ROM) 118, an image processing unit 114, an operation panel 113, a memory card slot 112, a print data processing unit 115, and a data bus 119. The host interface 111 transmits and receives data to/from an external device (e.g. personal computer (PC) 001). The ROM 118 stores a program that controls the apparatus, various printer control languages, and font data. The CPU 117 executes the program stored in the ROM 118 to control the entire apparatus and analyze the received command. The RAM 116 stores the image data externally-transmitted or control data. A memory card 002 is a detachable external storage device, and stores various data, such as pixel data, character pattern data, print form data, and various programs. According to the present exemplary embodiment, the description is given by assuming that the memory card 002 stores image data in the JPEG format. The memory card slot 112 is a connection unit for connection of the memory card 002. The image processing unit 114 converts the image data in the JPEG format into bit map data in a raster format or multi-valued data. The operation panel 113 has keys and a display unit, and sets/changes/displays a parameter on the print environment. Data received and transmitted in the controller unit 110 flows in the data bus 119.

Figure 8:
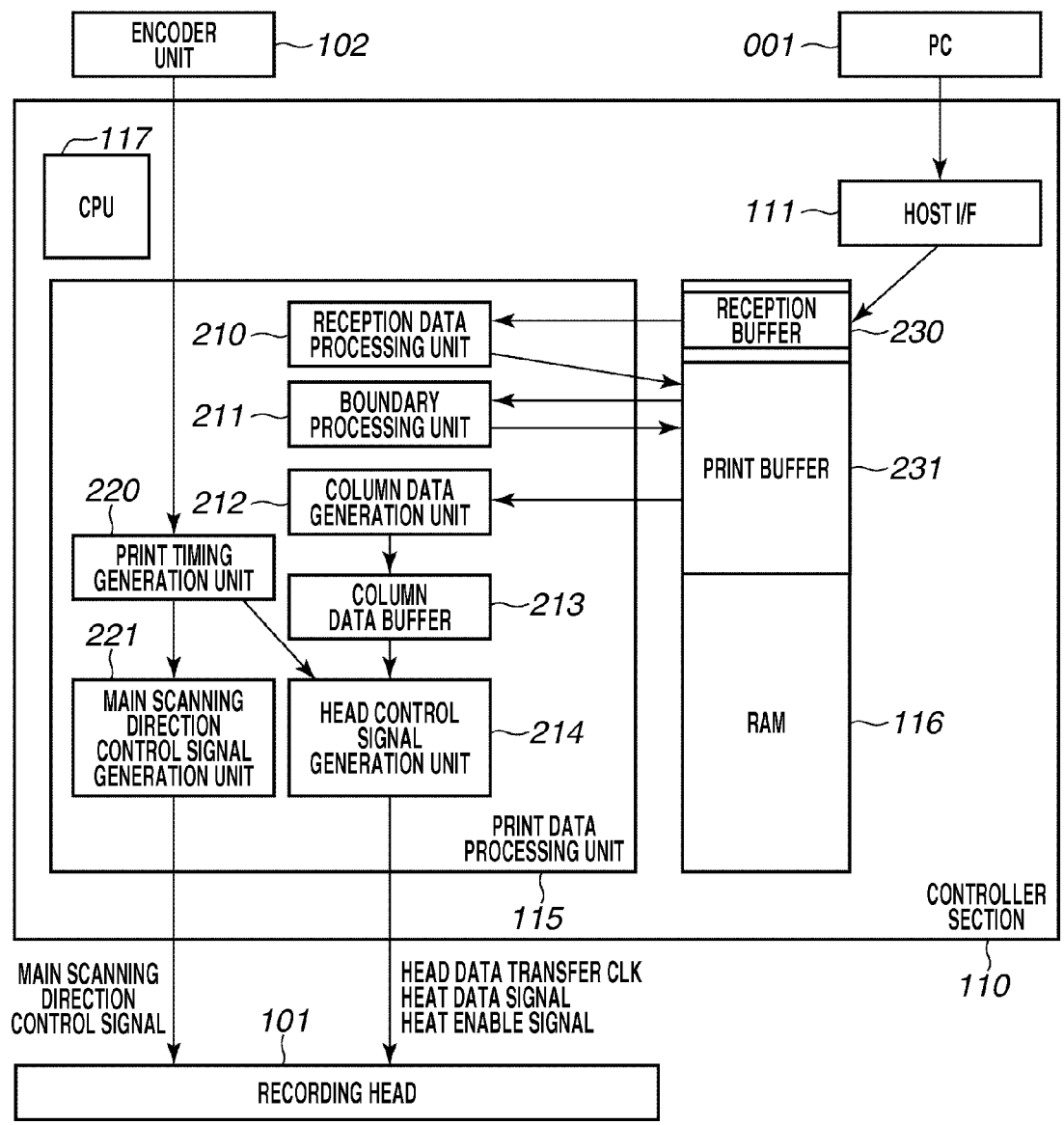
FIG. 8 illustrates a controller unit according to the exemplary embodiment.
Figure 9:
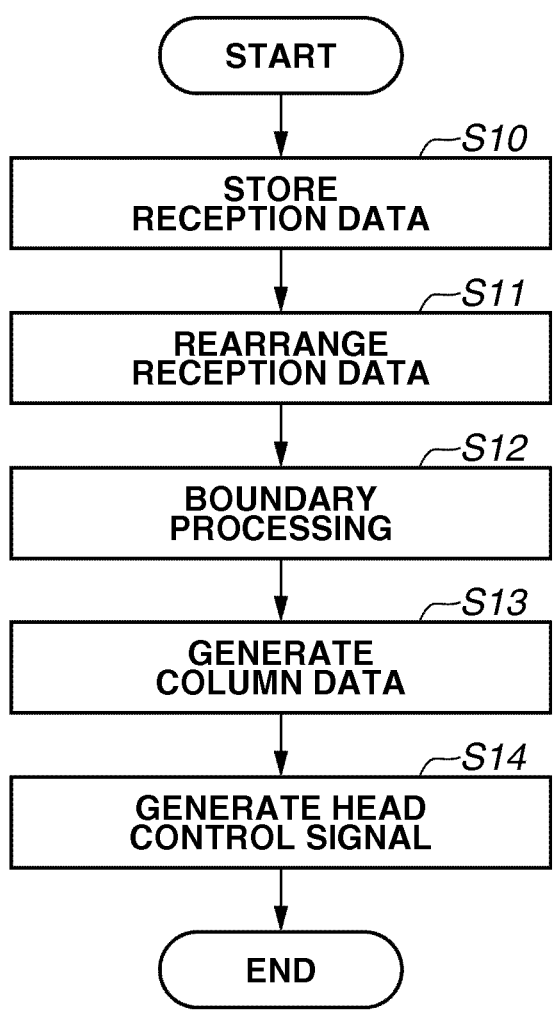
FIG. 9 illustrates a processing flowchart of the controller unit according to the exemplary embodiment.

A description is given of processing with the print data processing unit 115. FIG. 8 illustrates a diagram of a configuration of the controller unit 110. FIG. 9 illustrates a control flowchart of the controller unit 110.

Figure 14:
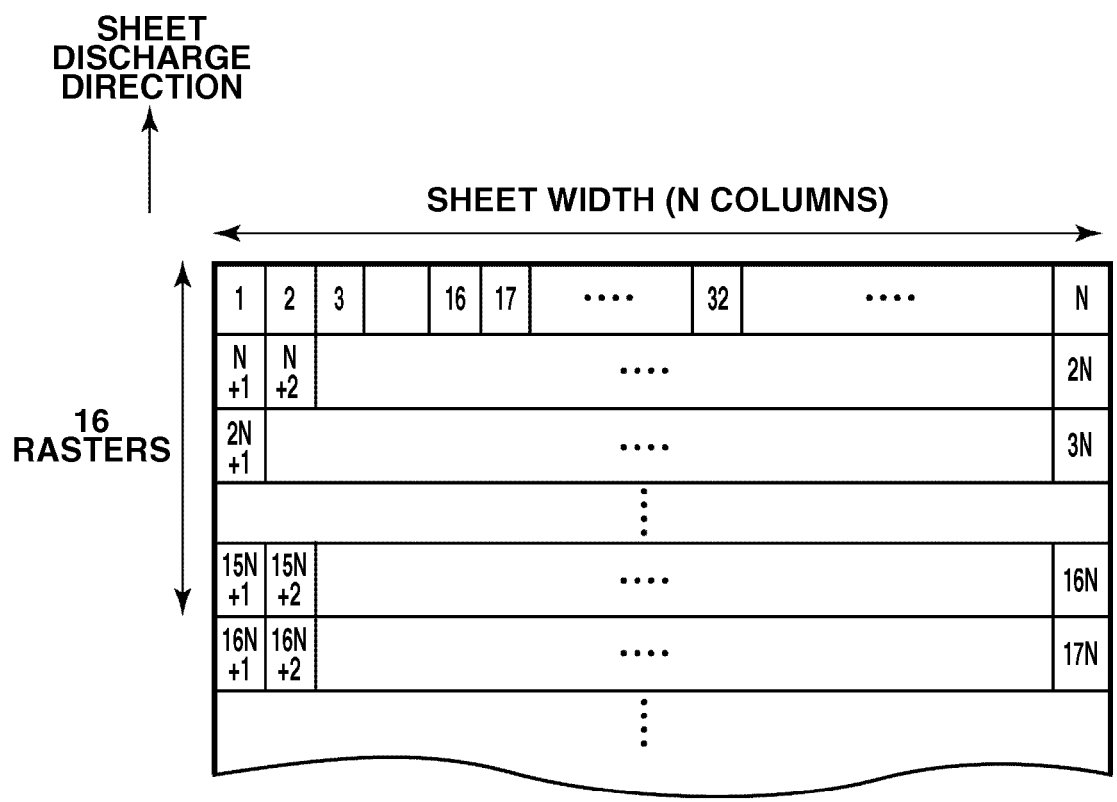
FIG. 14 illustrates a storage state of a reception buffer according to the first exemplary embodiment.
Figure 15:
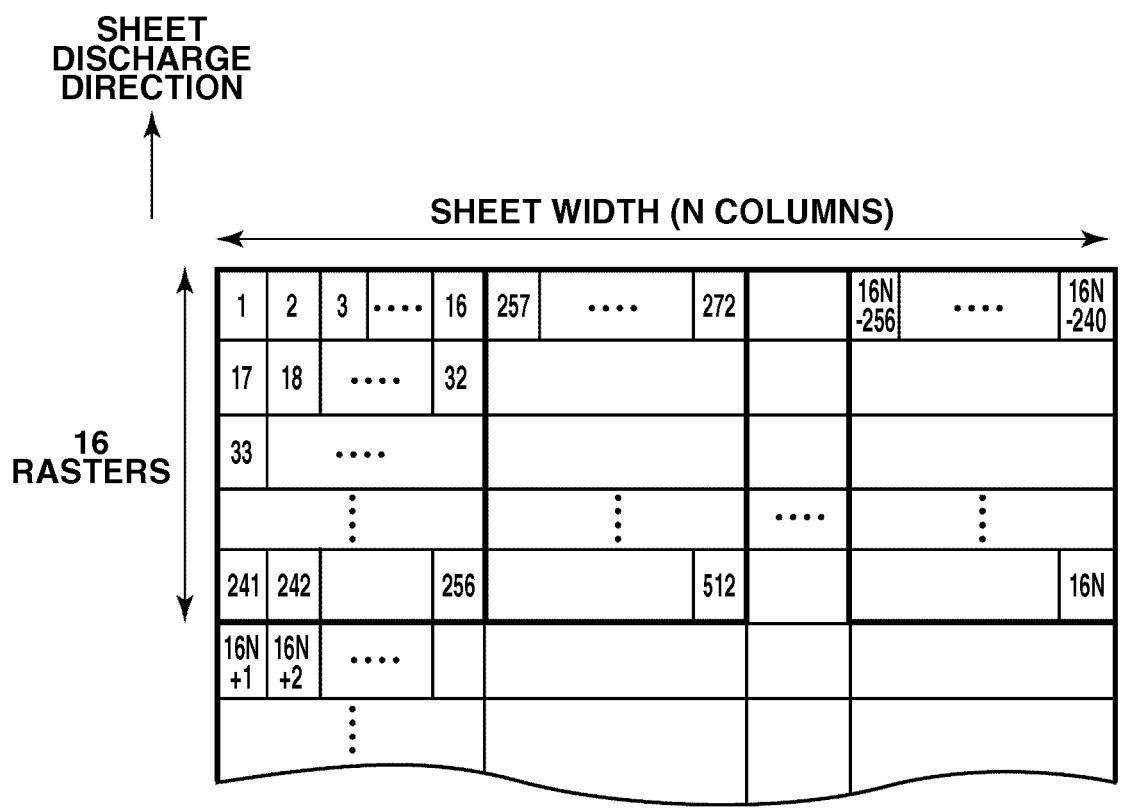
FIG. 15 illustrates a storage state of a print buffer according to the first exemplary embodiment.

In step S10, the host interface 111 stores the image data received from a personal computer (PC) (information device) 101 to a reception buffer 230. The image data is, e.g., bit map data (binary data). As illustrated in FIG. 14, the reception buffer 230 stores the image data for each color in the raster format, with one raster having N columns. When the bit map data indicates "1", dot printing is performed. When the bit map data indicates "0", the printing is not performed. In step S11, a reception data processing unit 210 rearranges the data in the raster format in a data array in FIG. 14, and stores the rearranged data to a print buffer 231. Raster data having 16 columns (dots) is rearranged to 16 rasters. That is, the data array is converted to perform data processing based on the unit of 16 bits. The data processing at the boundary portion is performed for a short time with read processing or write processing from/to the print buffer 231 based on the unit of 16 bits as an access unit to the memory. A storage state of the print buffer 231 is illustrated in FIG. 15.

Then, in step S12, a boundary processing unit 211 performs the boundary processing. In step S13, a column data generation unit 212 generates column data, and stores the generated data to a column buffer 213. The boundary processing according to the present exemplary embodiment indicates a series of processing from the dot counting processing to the thinning processing. In step S14, a head control signal generation unit 214 generates transfer data and a head control signal synchronously with a timing signal, and transfers the data and signal to the recording head 101. The transfer data is block data. The recording head 101 divides a nozzle into 16 blocks and time-divides the nozzle based on the unit of a block. The head control signal includes a head data transfer clock, a block designation signal, and a heat enable signal.

Figure 10:
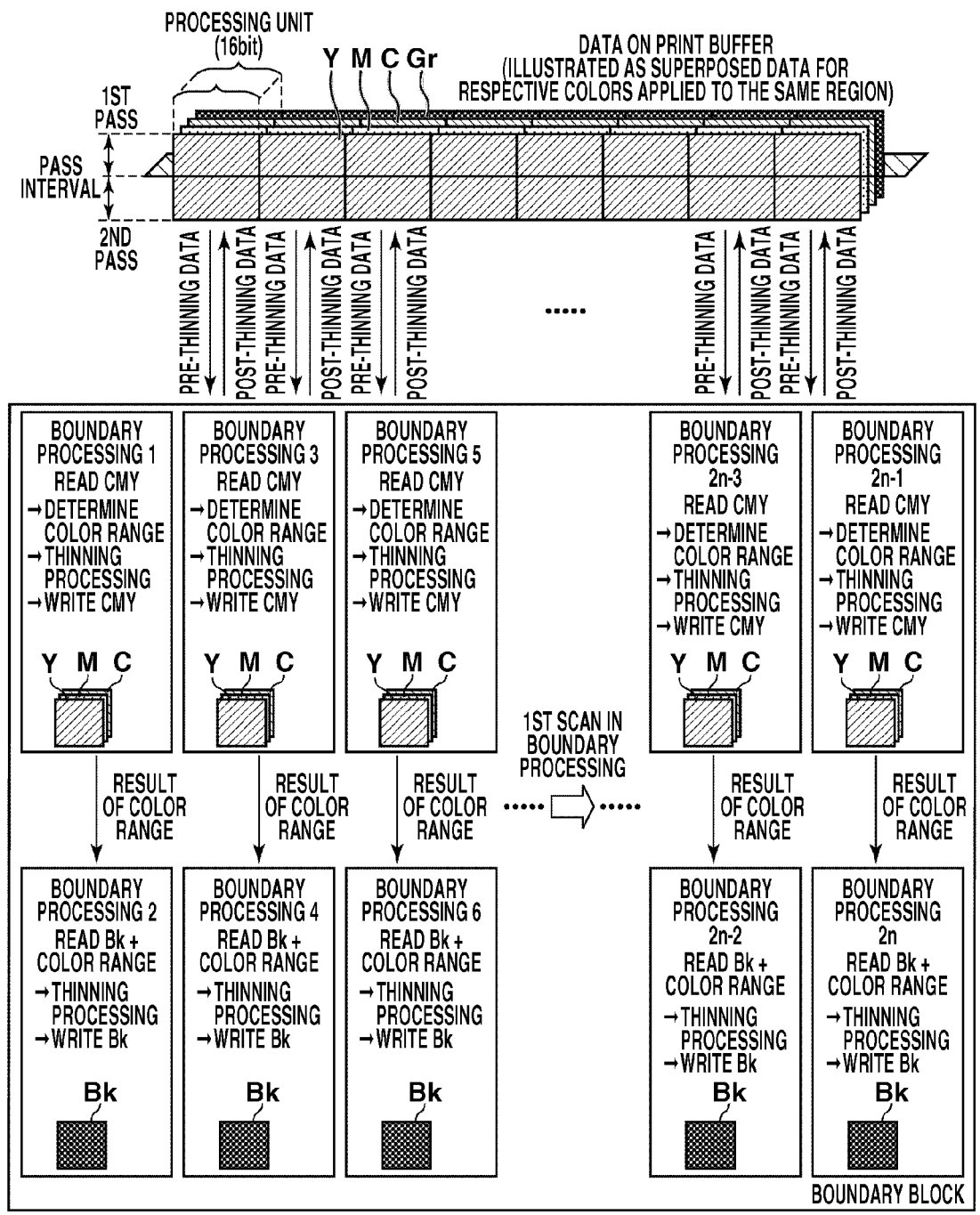
FIG. 10 illustrates boundary processing according to a first exemplary embodiment of the present invention.
Figure 11:
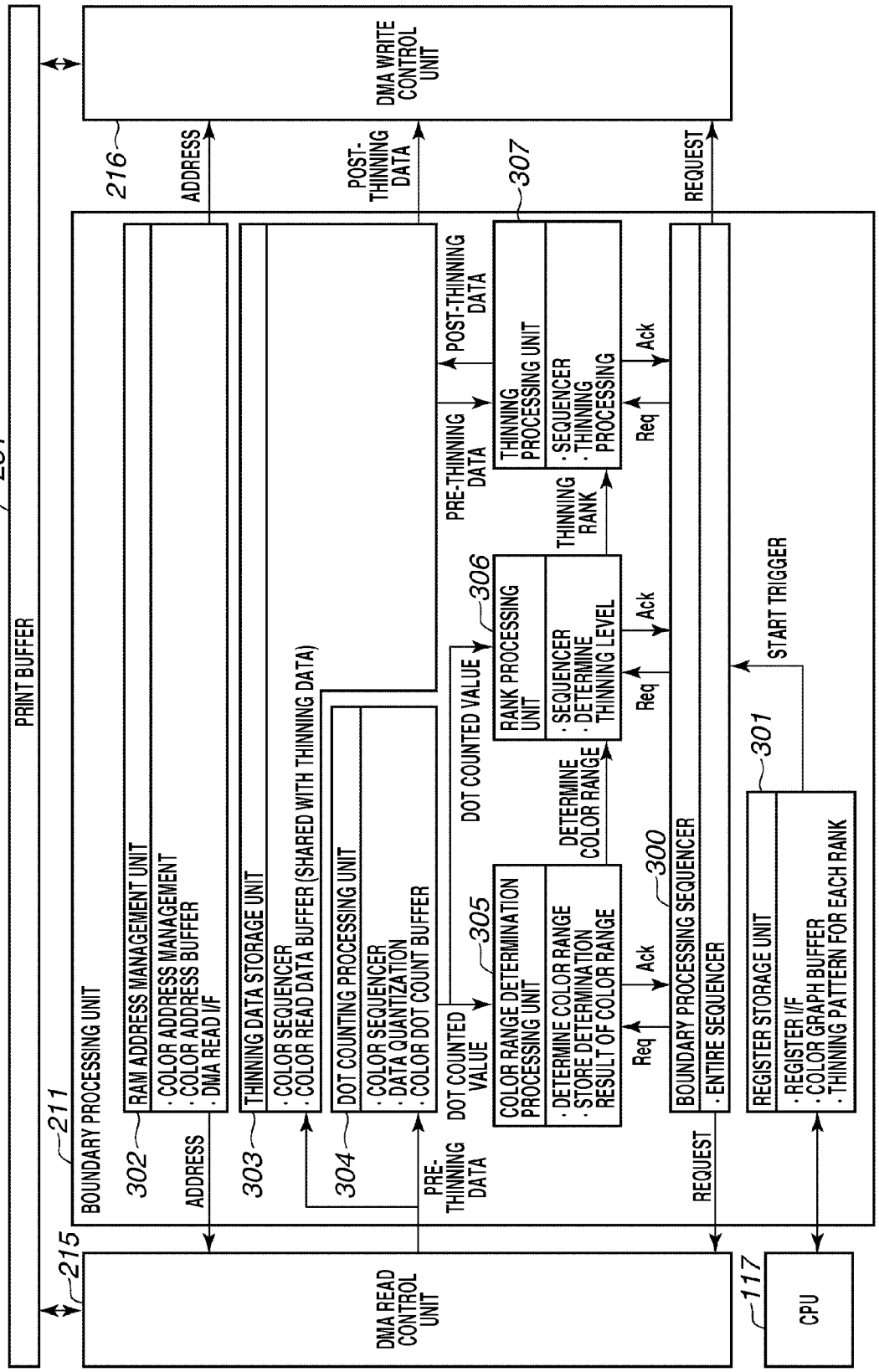
FIG. 11 illustrates a control circuit in a boundary processing unit according to the first exemplary embodiment.

FIG. 10 illustrates boundary processing according to a first exemplary embodiment of the present invention. FIG. 11 illustrates a configuration of the boundary processing unit 211 according to the first exemplary embodiment. A register storage unit 301 stores the rank graph for each color and the SMS thinning pattern for each thinning rank. According to the present exemplary embodiment, it is assumed that the register storage unit 301 stores a rank table (rank graph) and data on the SMS thinning pattern to a register. Alternatively, depending on the amount of rank data, the rank table and data may be stored in a memory such as a static random access memory (SRAM). In this case, a circuit for transmitting and receiving data to/from the memory is provided.

Figure 12:
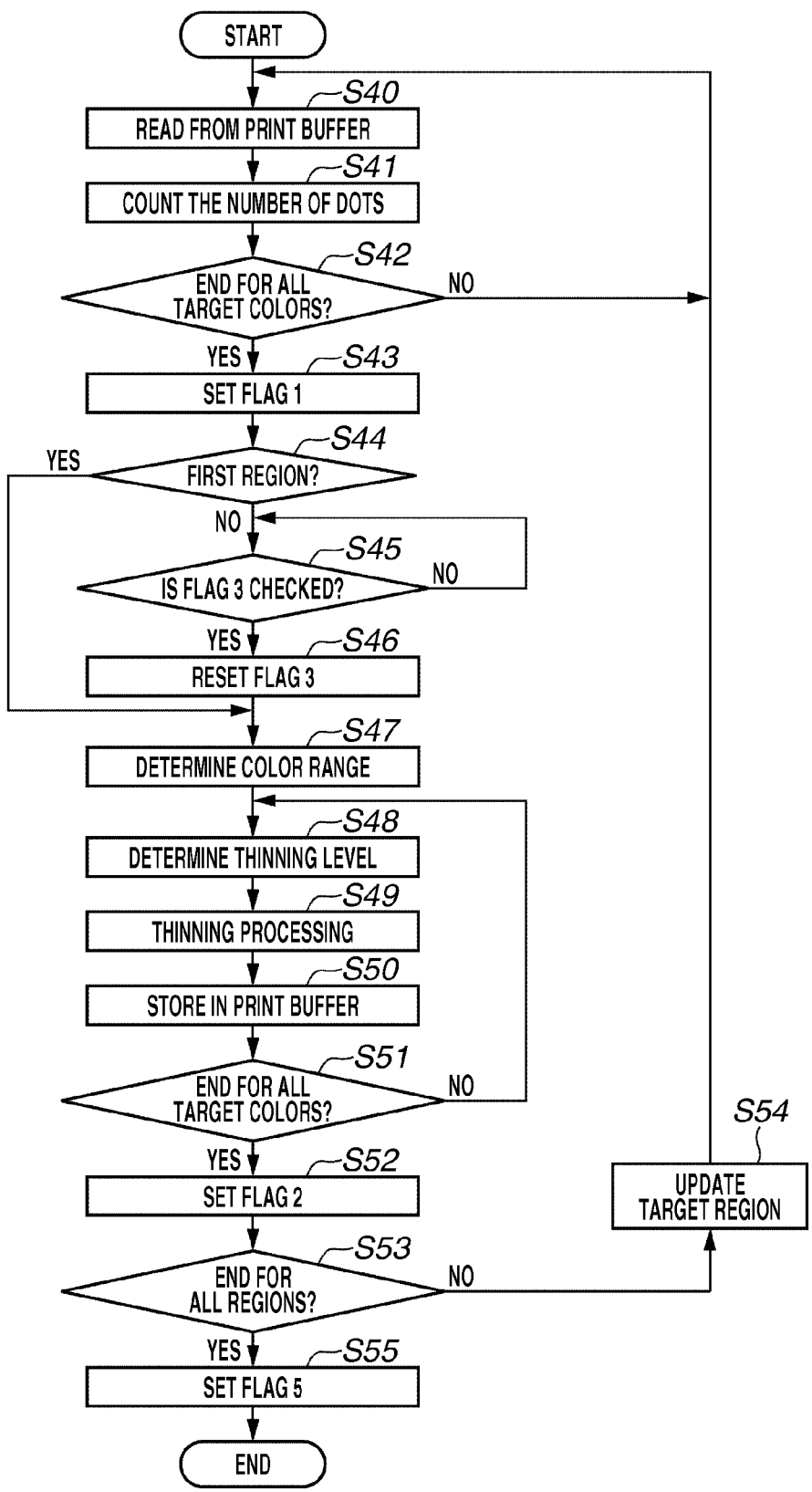
FIG. 12 illustrates a flowchart of the boundary processing of a color used for determination of a color range according to the first exemplary embodiment.
Figure 13:
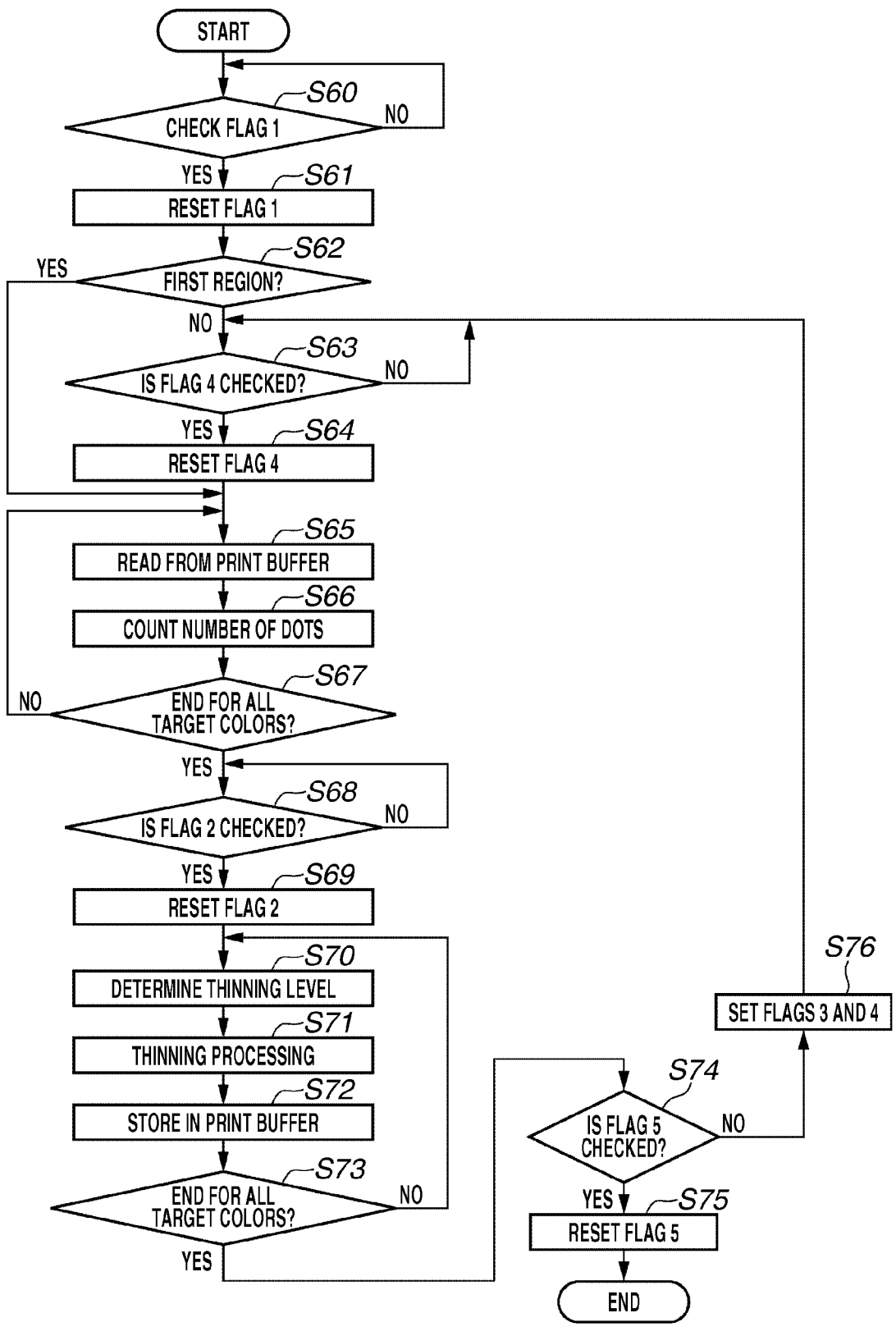
FIG. 13 illustrates a flowchart of the boundary processing of a color that is not used for the determination of the color range according to the first exemplary embodiment.

After storing the rank graph, division processing based on the unit of a constant number of columns is performed on pixel data for each color (cyan, magenta, yellow, or black). After waiting for storage of print data of all colors in a print data storage region 231, the CPU 117 starts the boundary processing. FIG. 12 is a flowchart of the boundary processing of the colors (e.g., cyan, magenta, and yellow) used for the determination of the color range. FIG. 13 illustrates a flowchart of the boundary processing of the color (e.g., black) that is not used for the determination of the color range.

The processing in FIG. 12 is briefly described. In steps S40 to S42, the data is read for each target color from the print buffer 231, and the number of dots is counted. After ending the processing of all target colors, the color range is determined. In steps S47 to S50, the thinning processing is performed to each target color and the thinned data is stored for printing. The processing is sequentially executed for every region. When the number of regions of interest (target regions) is 7 as illustrated in FIG. 2, the processing starts from the region BLK1 as the region of interest. In step S54, the region of interest is updated one by one, and the processing is executed for all regions including up to the region BLK7. Then, the processing in FIG. 12 ends.

The processing in FIG. 13 is briefly described. In steps S65 to S66, the data is read from the print buffer 231 for each target color, and the number of dots is counted. After ending the processing for all target colors, in steps S70 to 72, the thinning processing is performed for each target color with the color range obtained in FIG. 12, and the thinned data is stored for printing. The processing is sequentially executed for each region. When ending the processing for all regions of interest, the processing in FIG. 13 ends. The color that is not used for the determination of the color range is black. Alternatively, the color that is not used for the determination of the color range may be a specific color such as gray, red, or green, or light color ink of light cyan or light magenta. The color that is not used for the determination of the color range is not limited to one color, and may be a plurality of colors (two or more colors) including the colors (gray, red, green, light cyan, and light magenta). With the configuration using light cyan or light magenta, the thinning level of light cyan or light magenta may be similar to that of cyan or magenta to reduce the processing load.

In the processing in FIGS. 12 and 13, with five flags 1 to 5, weighting processing thereof is performed. The processing executed in FIG. 12 is synchronized with the processing executed in FIG. 13 to properly perform the processing. In steps S45, S60, S63, S68, and S74, it is checked whether the flag is set, and the operation is waited until the flag is set. When the flag is set, the flag is reset in the subsequent step. With the configuration, it is possible to execute dot counting processing in step S41 of the color used for the determination of the color range and dot counting processing in step S66 of the color that is not used for the determination of the color range at different timings. Similarly, it is possible to execute the processing in step S48 for determining the thinning level of the color used for the determination of the color range and the processing in step S70 for determining the thinning level of the color that is not used for the determination of the color range at different timings. Further, it is possible to execute the processing in step S49 for thinning the color used for the determination of the color range and the processing in step S71 for thinning the color that is not used for the determination of the color range at different timings. A control flow is structured to execute in parallel the thinning processing of the previous region (e.g., BLK2) in FIG. 12 and the dot counting processing of the subsequent region (e.g., BLK1) in FIG. 13.

Next, a description is given of the processing in FIG. 12. The operation starts by setting a first region as the region of interest and a first color. In step S40, direct memory access (DMA) means reads print data in the dot counting region in the boundary portion between the bands from the print buffer 231. In step S41, the number of dots of the read data is counted. The counting number of dots is stored for each color. After performing the processing for all colors used for the determination of the color range (YES in step S42), in step S47, the determination of the color range processing unit 305 determines the color range in the boundary processing region.

The setting of the flag 1 in step S43 is referred to when executing the processing FIG. 13, which will be described later. In step S45, it is checked whether the flag 3 is set to check whether the thinning processing of the region of interest has been already executed in the processing in FIG. 13, which will be described below. In step S44, it is determined whether the region is the first one as the region of interest. Because, when the region is the first one (e.g., BLK1 in FIG. 2) (YES in step S44), the processing in steps S45 and S46 is not required and the processing is skipped.

In step S48, the thinning rank of the color is determined from the already-stored rank graph data of the color and determination result of color range. In this case, when the thinning region is divided into the two portions of the upper portion and the lower portion, there are the two upper and lower portions as the thinning ranks of one color. After determining the thinning rank, in step S49, the thinning processing of the upper and lower portions for the color is performed with the SMS thinning pattern corresponding to the thinning rank. After the thinning processing, in step S50, the thinned print data is written (stored) back in the similar address to the address when reading the data from the print buffer 231. With the similar address, pre-thinning print data and post-thinning print data may not be stored. As a consequence, the memory space in the RAM 116 is effectively used. In step S51, it is determined whether the processing ends for all target colors. If YES in step S51, then in step S52, the flag 2 is set. In step S68 in FIG. 13, the flag 2 is set. Then, the thinning processing is performed. In step S53, it is determined whether the processing ends for all regions of interest. If YES in step S53, then in step S55, the flag 5 is set. If NO in step S53, then in step S54, the region of interest is updated.

Next, the processing in FIG. 13 is described. In step S60, the setting of the flag 1 is checked. By checking the flag 1, it is checked that the dot counting processing in FIG. 12 ends. In step S63, the setting of the flag 4 is checked. By checking the flag 4, it is checked that the dot counting processing in FIG. 12 in the one-previous region ends.

In step S65, the DMA means reads the print data in the dot counting region of the band boundary portion from the print buffer 231. In step S66, dot-number counting processing is performed. In step S67, it is determined whether the processing ends for all target colors. If YES in step S67, the processing advances to step S68. If NO in step S67, the processing returns to step S65. In step S68, it is checked whether the flag 2 is set. When the flag 2 is set (YES in step S68), the thinning processing in FIG. 12 ends, indicating that the rank processing unit 306 and the thinning processing unit 307 are available. When the flag 2 is not set (NO in step S68), the rank processing unit 306 or the thinning processing unit 307 is used and the operation is thus waited until the flag 2 is set.

When the flag 2 is set (YES in step S68), then in step S69, the flag 2 is reset and the processing proceeds to step S70. The processing is sequentially performed in order of determination of the thinning level in step S70, the thinning processing in step S71, and storage of the thinned data to the print buffer 231 in step S72. In step S73, it is checked whether the processing is executed for all target colors. If YES in step S73, the processing proceeds to step S74. If NO in step S73, the processing returns to step S70.

In step S74, it is checked whether the flag 5 is set. By checking the flag 5, it is checked whether the processing is executed for all regions. If YES in step S74, the processing ends. If NO in step S74, then in step S76, the flags 3 and 4 are set. Then, the processing proceeds to step S63.

With the configuration, it is possible to execute the dot counting processing, the determination processing of the thinning level, and the thinning processing at different timings between the color that is used for the determination of the color range and the color that is not used for the determination of the color range. Therefore, according to the present exemplary embodiment, one circuit is shared between the color that is used for the determination of the color range and the color that is not used for the determination of the color range in the individual dot counting processing unit 304, rank processing unit 306, and thinning processing unit 307. As a consequence, the increase in circuit scale can be suppressed and the processing speed can be high.

Figure 16:
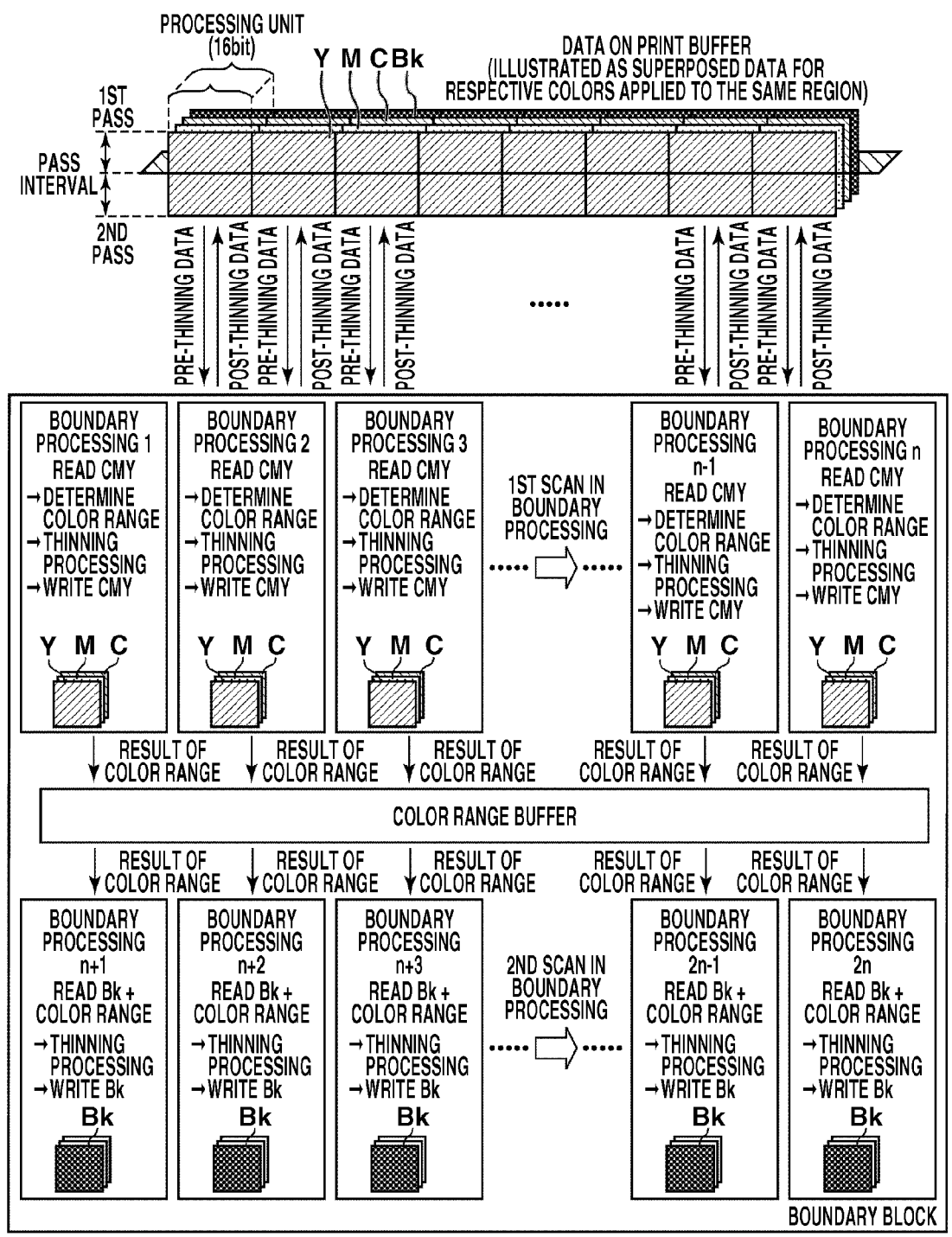
FIG. 16 illustrates boundary processing according to a second exemplary embodiment of the present invention.
Figure 17:
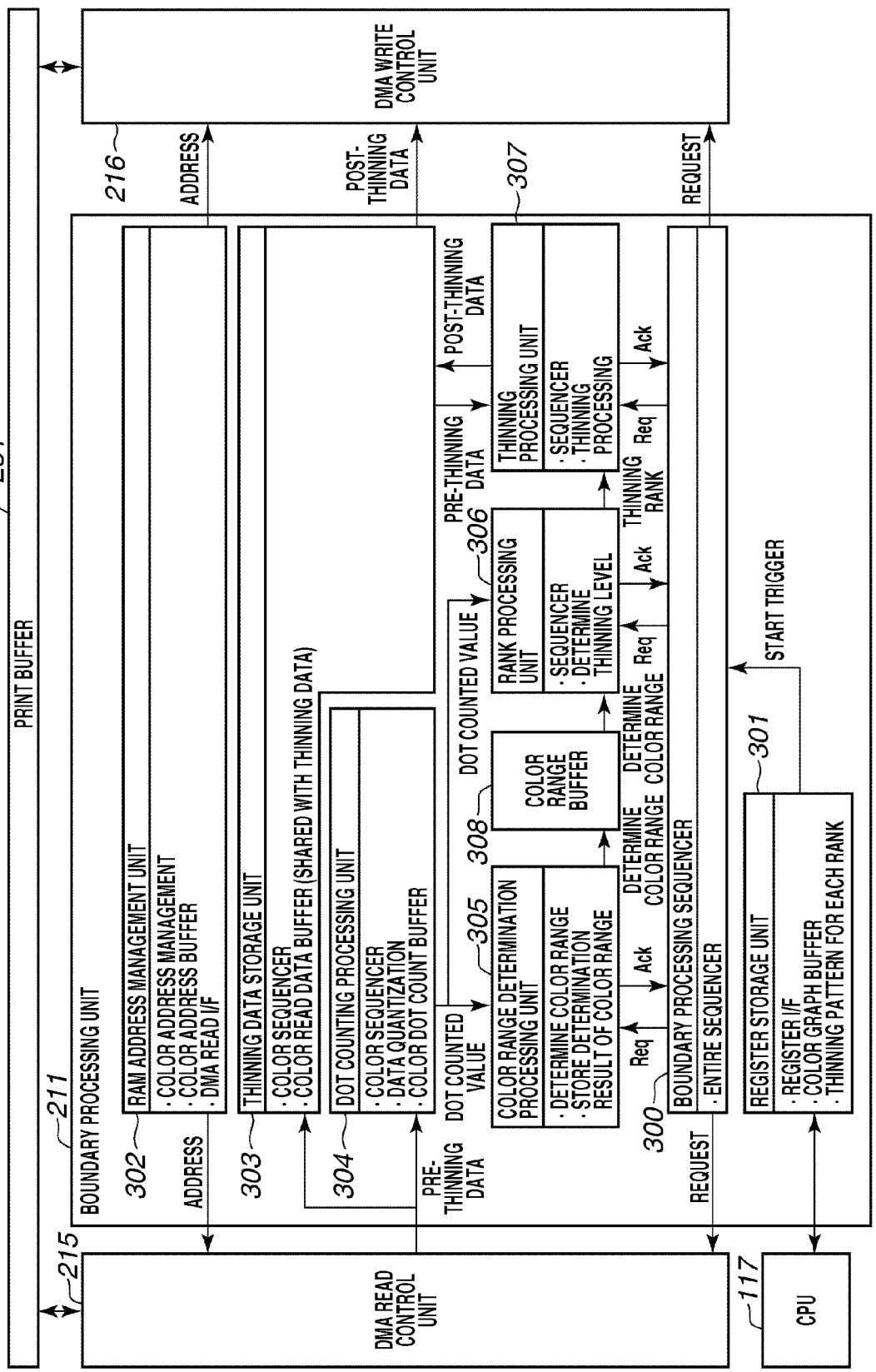
FIG. 17 illustrates a control circuit of a boundary processing unit according to the second exemplary embodiment.
Figure 18:
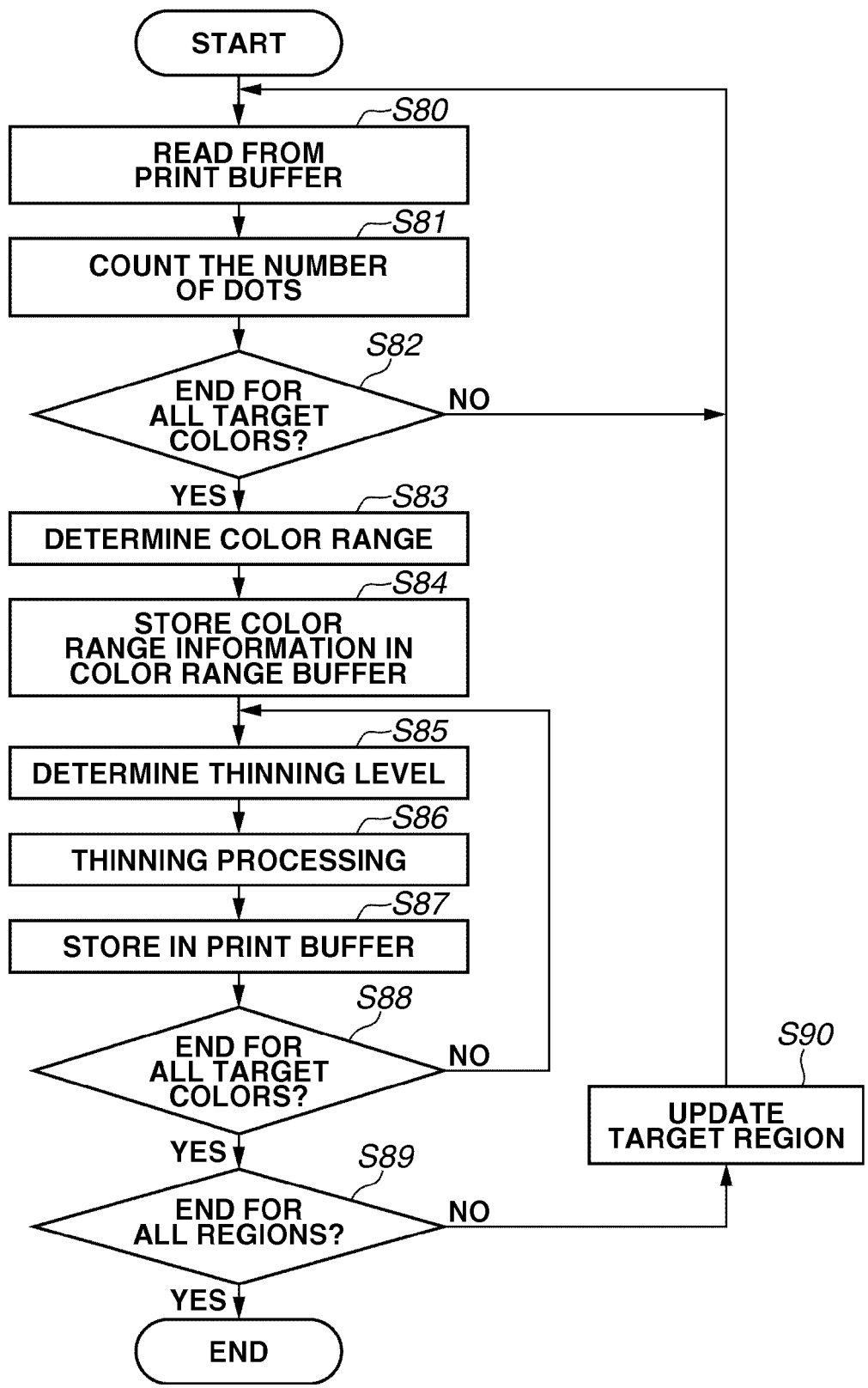
FIG. 18 illustrates a flowchart of the boundary processing of a color that is used for determination of a color range according to the second exemplary embodiment.
Figure 19:
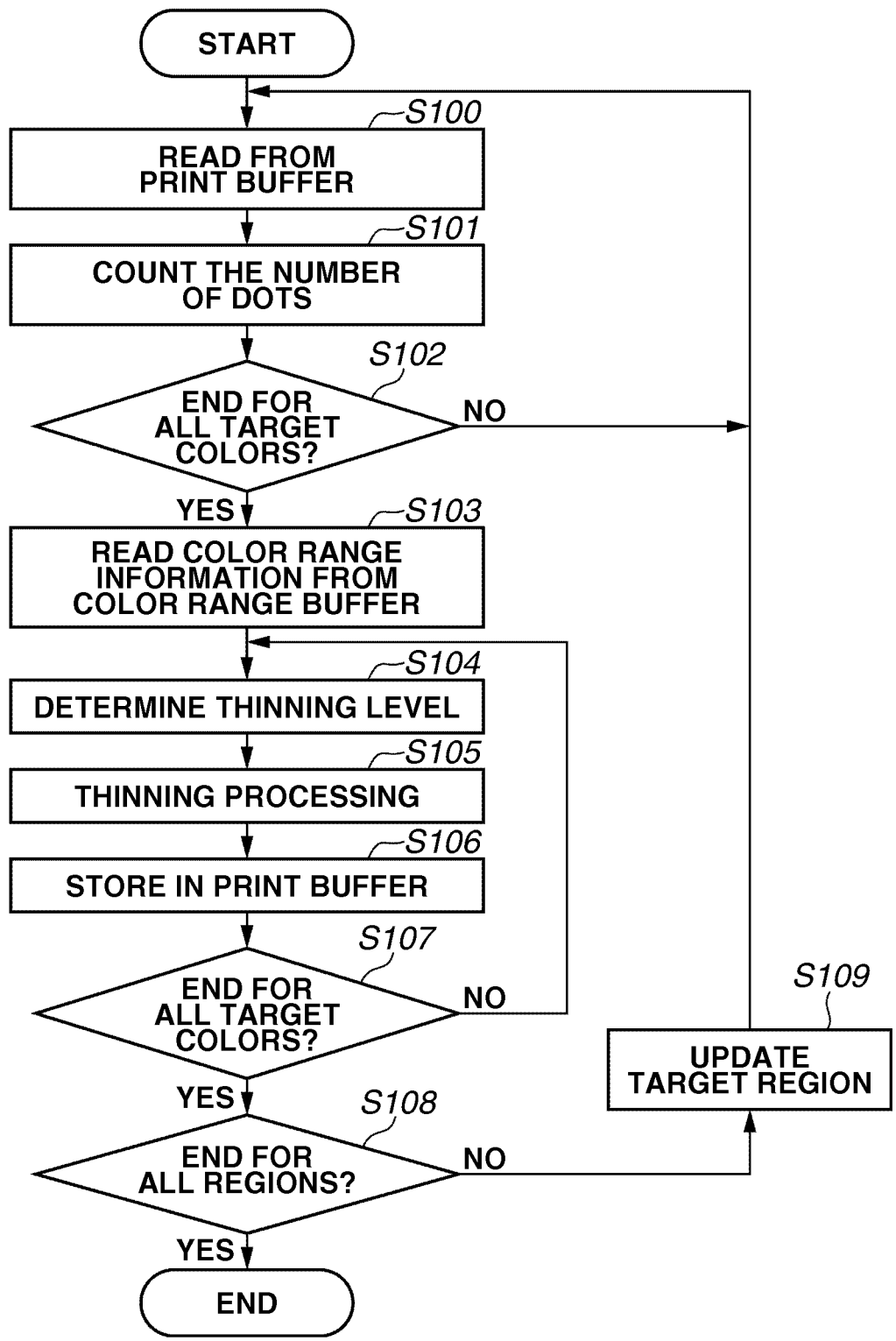
FIG. 19 illustrates a flowchart of the boundary processing of a color that is not used for the determination of the color range according to the second exemplary embodiment.

Data processing of the boundary processing unit 211 is specifically described according to a second exemplary embodiment of the present invention. FIG. 16 illustrates the boundary processing in one boundary portion (e.g., the boundary portion between the first and second bands). FIG. 17 illustrates a block diagram of the boundary processing unit 211. FIG. 18 illustrates a flowchart of the thinning processing of data corresponding to the color (e.g., cyan, magenta, or yellow) used for the determination of the color range in the boundary processing of one boundary portion. FIG. 19 illustrates a flowchart of the thinning processing of data corresponding to the color (e.g., black) that is not used for the determination of the color range in the boundary processing of one boundary portion.

Different points from those according to the first exemplary embodiment are described and the same contents are not described. According to the second exemplary embodiment, the boundary processing is performed in advance for the colors (cyan, magenta, and yellow) used for the determination of the color range. The regions are processed, starting from the left ones in FIG. 16. For example, the processing is sequentially performed in the scanning direction in order of boundary processing 1, boundary processing 2, boundary processing 3, and boundary processing n. Subsequently, the boundary processing of the color (e.g., black) that is not used for the determination of the color range is performed. The processing is sequentially performed in the scanning direction in order of boundary processing n+1, boundary processing n+2, boundary processing n+3, and boundary processing 2n. A sequence of the boundary processing is divided into boundary processing (first sequence) of the color that is used for the determination of the color range and boundary processing (second sequence) of the color that is not used for the determination of the color range.

Therefore, when performing the boundary processing of the colors (cyan, magenta, and yellow) used for the determination of the color range, the determination result of the color range is stored in a color range buffer 308. Based on the determination result of the color range stored in the memory, the boundary processing of the color (black) that is not used for the determination of the color range is performed. In this case, the boundary processing is performed by reading the value of the determination of the used color range, stored in the color range buffer 308. Although the color range buffer 308 is a static random access memory (SRAM), it may be a dynamic random access memory (DRAM).

FIG. 17 illustrates a configuration of the boundary processing unit 211 according to the second exemplary embodiment. Different points from those according to the first exemplary embodiment are described, and the similar contents are not described. Unlike the first exemplary embodiment, the boundary processing unit 211 includes the color range buffer 308 that stores the determination result of the color range. In the boundary processing (second sequence), the rank processing unit 306 reads the determination result of the color range from the color range buffer 308, and determines the thinning rank of black from the rank graph data and the determination result of the color range. This point is different from those according to the first exemplary embodiment.

Similarly to the boundary processing of CMY (cyan, magenta, and yellow), before starting the processing of black, the rank graph of black and the SMS thinning pattern for each thinning rank are stored in the register storage unit 301. The storage region of black in this case is identical to the storage region of cyan in the circuit configuration. Because information required as CMY data is only the determination result of color range for the boundary processing of black. Thus, a processing circuit and a data storage circuit other than the register storage unit 301 are common to any of circuits for three colors CMY. This is a circuit configuration embodied by dividing the sequence into the boundary processing of CMY and the boundary processing of black. The suppression of the increase in circuit scale due to the increase in number of colors results in reduction in product costs.

A description is given of the thinning processing of the data corresponding to the colors (e.g., cyan, magenta, and yellow) used for the determination of the color range in the boundary processing of one boundary portion with reference to FIG. 18. In step S80, the print data is read from the print buffer 231. In step S81, the number of dots is counted. In step S82, the processing ends for all target colors (cyan, magenta, and yellow). When the processing ends (YES in step S82), the processing proceeds to step S83. When the processing does not end (NO in step S82), the processing returns to step S80 and then continues. In step S83, the color range is determined. In step S84, the determination result is stored in the color range buffer 308. In step S85, the thinning level is determined. In step S86, the thinning processing is performed. In step S87, the thinned data is stored in the print buffer 231. In step S88, the processing ends for all the target colors (cyan, magenta, and yellow). When the processing ends (YES in step S88), the processing proceeds to step S89. When the processing does not end (NO in step S88), the processing returns to step S85 and then continues. In step S89, it is determined whether the processing ends for all regions. When the processing ends for all regions (YES in step S89), the processing ends. When the processing does not end (NO in step S89), then in step S90, the region of interest is updated and the processing continues.

A description is given of the thinning processing of the data corresponding to the color (e.g., black) that is not used for the determination of the color range in the boundary processing of one boundary portion with reference to FIG. 19. In step S100, the print data is read from the print buffer 231. In step S101, the number of dots is counted. In step S102, the processing ends for all the target color (black). When the processing ends (YES in step S102), the processing proceeds to step S103. When the processing does not end (NO in step S102), the processing returns to step S100 and then continues. In step S103, the determination result is read from the color range buffer 308. In step S84 in FIG. 18, the color range information stored in the color range buffer 308 is read. In step S104, the thinning level is determined. In step S105, the thinning processing is performed. In step S106, the thinned data is stored in the print buffer 231. In step S87, the processing ends for all the target colors (herein, only black). When the processing ends (YES in step S87), the processing proceeds to step S108. When the processing does not end (NO in step S87), the processing returns to step S104 and then continues. In step S108, the processing ends for all regions. When the processing ends for all regions (YES in step S108), the processing ends. When the processing does not end (NO in step S108), then in step S109, an address of the region of interest is updated and the processing continues.

According to the second exemplary embodiment, the processing relates to that of one color as black. Similarly to the first exemplary embodiment, the processing may be executed for a plurality of colors.

When executing the processing for a plurality of colors, in the boundary processing for gray and red in addition to black, the dot counting value of black is stored in the dot counting region that stores the dot counting value of cyan in the second sequence. Similarly, the dot counting value of gray is stored in the dot counting region of magenta, and the dot counting value of red is stored in the dot counting region of yellow.

Further, in the boundary processing of green and blue, the boundary processing of the third sequence may be executed. Specifically, the first sequence is the boundary processing of CMY, the second sequence is the boundary processing of black, gray, and red, and the third sequence is the boundary processing of green and blue. The boundary processing ends for all colors in the identical boundary portion. Even if the number of colors subjected to the boundary processing increases, the processing can be executed by increasing the number of sequences.

In addition to the above-described exemplary embodiments, the following may be embodied. The image data received from a personal computer (PC) (information device) 001 is described with bit map data (binary data). For example, multi-valued data (with 4 bits and 16 gradations per pixel) may be used. Similarly to the processing, the dot counting value is acquired, the color range is determined, and a value of the multi-valued data is converted, thereby thinning the data used for recording with the recording head 101.

In the processing flow (in FIGS. 12, 13, 18, and 19), weighting processing is performed with the flags. Alternatively, the processing may be executed by referring to status information indicating the processing status.

The colors used for the determination of the color range are, e.g., cyan, magenta, and yellow. However, the combinations of the colors is not limited to this, and another combination may be used. In the determination of the color range, both the hue and the saturation are acquired, and a data reduction method is determined depending on the result. Only the hue of the unit region may be acquired from the amount of data (the dot counting value) of the color, and the color reduction method may be determined.

According to the present exemplary embodiment, seven regions having 16 columns×16 rasters are assigned to the unit of the boundary processing as illustrated in FIG. 2. Alternatively, the region size may be 16 columns×32 rasters, or 32 columns×32 rasters. The number of regions is not limited to 7 and may be another.

According to the present exemplary embodiment, the description is given of a serial-scanning type inkjet recording apparatus. The present invention can be widely applied to a recording apparatus for recording an image by applying a recording agent other than the ink, such as toner, for example, based on the unit of a band.

According to the present exemplary embodiment, the boundary processing unit 211 in the recording apparatus executes the boundary processing of the binary recording data transmitted from the personal computer (PC) connected to the recording apparatus according to the exemplary embodiments. However, a printer driver installed on the personal computer may execute the processing of recording data generated by application software in the personal computer according to the present exemplary embodiment, transmit the generated data to the recording apparatus, and cause the recording apparatus to record the data. The present invention includes a program of computer executable instructions that can be executed by one or a plurality of computers for realizing the processing according to the exemplary embodiments and a storage medium for storing the program. The computer may comprise one or more CPU, micro processing unit (MPU), or other circuitry, and may include a network of separate computers or separate computer processors. The computer executable instructions may be provided to the computer, for example, from a network or from the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An apparatus for effecting recording on a recording medium by applying a plurality of recording agents including a first-type recording agents and a second-type recording agent with relative scanning between a recording unit for applying the recording agents and the recording medium, the apparatus comprising:

an obtaining unit configured to obtain relative information indicating a relative relation between amounts of the first-type recording agents, without amount of the second-type recording agent, corresponding to each of plural colors to be applied in a neighborhood of a boundary between adjacent bands in the relative scanning of the recording unit and the recording medium; and a determining unit configured to determine, for the second-type recording agent, a reduction rate of an amount of the second-type recording agent to be applied to the neighborhood of the boundary based on the relative information obtained by the obtaining unit.

2. The apparatus according to claim 1, wherein the determining unit determines, for the second-type recording agent and for each of the first-type recording agents, the reduction rate of an amount of the second-type recording agent and each of the first-type recording agents to be applied to the neighborhood of the boundary based on the relative information obtained by the obtaining unit.

3. The apparatus according to claim 1, wherein the obtaining unit obtains the relative information indicating the relative relation between the amounts of the first-type recording agents to be applied for each of plural unit areas provided by dividing an area in the neighborhood of the boundary between the adjacent bands in the relative scanning of the recording unit and the recording medium.

4. The apparatus according to claim 1, wherein the determining unit determines the reduction rate in accordance with the relative information obtained by the obtaining unit and the amount of each of the first-type recording agents and the second-type recording agent to be applied to the neighborhood of the boundary.

5. The apparatus according to claim 1, wherein the amount corresponds to a number of dots of the recording agent applied by the recording unit.

6. The apparatus according to claim 1, wherein the neighborhood of the boundary includes a first area in a preceding band among the adjacent bands and a second area in a subsequent band among the adjacent bands, and wherein the determining unit determines the reduction rate for the first area and the second area.

7. The apparatus according to claim 1, wherein the first-type recording agents includes recording agent of cyan, magenta, or yellow.

8. The apparatus according to claim 1, wherein the second-type recording agent includes recording agent of black, gray, red, green, light cyan, or light magenta.

9. The apparatus according to claim 1, further comprising a reducing unit configured to reduce amounts of the first-type recording agents and the second-type recording agent to be applied to the neighborhood of the boundary from amounts of the first-type recording agents and the second-type recording agents represented by input image data in accordance with the reduction rate determined by the determining unit, and a recording device including the recording unit configured to record an image on the recording medium according to the input image data which is reduced to the amounts of the first-type recording agents and the second-type recording agent to be applied to the neighborhood of the boundary by the reducing unit.

10. A method for effecting recording on a recording medium by applying a plurality of recording agents including a first-type recording agents and a second-type recording agent with relative scanning between a recording unit for applying the recording agents and the recording medium, the apparatus comprising:
obtaining relative information indicating a relative relation between amounts of the first-type recording agents, without amount of the second-type recording agent, corresponding to each of plural colors to be applied in a neighborhood of a boundary between adjacent bands in the relative scanning of the recording unit and the recording medium; and
determining, for the second-type recording agent, a reduction rate of an amount of the second-type recording agent to be applied to the neighborhood of the boundary based on the obtained relative information.

11. The method according to claim 10, wherein the reduction rate of an amount of the second-type recording agent and each of the first-type recording agents to be applied to the neighborhood of the boundary based on the obtained relative information is determined for the second-type recording agent and for each of the first-type recording agents.

12. The method according to claim 10, wherein the obtained relative information indicates the relative relation between the amounts of the first-type recording agents to be applied for each of plural unit areas provided by dividing an area in the neighborhood of the boundary between the adjacent bands in the relative scanning of the recording unit and the recording medium.

13. The method according to claim 10, wherein the reduction rate is determined in accordance with the relative information obtained by the obtaining unit and the amount of each of the first-type recording agents and the second-type recording agent to be applied to the neighborhood of the boundary.

14. The method according to claim 10, wherein the amount corresponds to a number of dots of the recording agent applied by the recording unit.

15. The method according to claim 10, wherein the neighborhood of the boundary includes a first area in a preceding band among the adjacent bands and a second area in a subsequent band among the adjacent bands, and wherein the reduction rate is determined for the first area and the second area.

16. The method according to claim 10, wherein the first-type recording agents includes recording agent of cyan, magenta, or yellow.

17. The method according to claim 10, wherein the second-type recording agent includes recording agent of black, gray, red, green, light cyan, or light magenta.

18. The method according to claim 10, further comprising reducing amounts of the first-type recording agents and the second-type recording agent to be applied to the neighborhood of the boundary from amounts of the first-type recording agents and the second-type recording agents represented by input image data in accordance with the determined reduction rate, and recording an image on the recording medium by using the recording unit according to the input image data which is reduced the amounts of the first-type recording agents and the second-type recording agent to be applied to the neighborhood of the boundary.

19. A non-transitory computer-readable storage medium storing a computer-executable program for causing at least one computer to execute the method according to claim 10.

* * * * *